(12) United States Patent
Simske et al.

(10) Patent No.: US 9,613,327 B2
(45) Date of Patent: Apr. 4, 2017

(54) ADAPTING AN INCREMENTAL INFORMATION OBJECT

(71) Applicant: HEWLETT-PACKARD DEVELOPMENT COMPANY, L.P., Houston, TX (US)

(72) Inventors: Steven J Simske, Fort Collins, CO (US); Marie Vans, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 14/747,435

(22) Filed: Jun. 23, 2015

(65) Prior Publication Data

US 2015/0294242 A1  Oct. 15, 2015

Related U.S. Application Data

(63) Continuation of application No. 13/106,052, filed on May 12, 2011, now Pat. No. 9,092,745.

(51) Int. Cl.
*G06K 19/06* (2006.01)
*G06Q 10/06* (2012.01)
*G06K 7/14* (2006.01)

(52) U.S. Cl.
CPC ....... *G06Q 10/06* (2013.01); *G06K 19/06037* (2013.01); *G06K 7/1417* (2013.01); *G06K 7/1434* (2013.01); *G06K 19/06009* (2013.01); *G06K 19/06028* (2013.01); *G06K 2019/06281* (2013.01)

(58) Field of Classification Search
CPC ... G06K 19/06037; G06K 2019/06281; G06K 19/06028; G06K 2019/06225; G06K 1/121; G06Q 10/06
See application file for complete search history.

(56) References Cited

U.S. PATENT DOCUMENTS

| | | | |
|---|---|---|---|
| 5,871,288 A | 2/1999 | Ryan, Jr. et al. | |
| 6,119,943 A * | 9/2000 | Christy | G06K 1/121 235/462.04 |
| 7,050,650 B2 | 5/2006 | Maurer et al. | |
| 7,068,855 B2 | 6/2006 | Simske et al. | |
| 7,229,025 B2 | 6/2007 | Sussmeir et al. | |
| 7,246,748 B1 * | 7/2007 | Feuerman | G06K 17/0022 235/462.09 |
| 7,333,240 B2 | 2/2008 | Amela et al. | |

(Continued)

FOREIGN PATENT DOCUMENTS

GB  2466239 A  9/1999
JP  11265419 A  10/2008

*Primary Examiner* — Christopher Stanford
(74) *Attorney, Agent, or Firm* — International IP Law Group, PLLC

(57) ABSTRACT

Systems and methods for adapting an incremental information object (IIO) to accommodate a change in a workflow are provided. A method includes analyzing an IIO, wherein the IIO comprises a plurality of tiles, and wherein the plurality of tiles comprise a code. The code is confirmed and, if the confirmation is successful, a determination is made as to whether the workflow has changed. If the workflow has changed the IIO is modified to change the information density of the IIO, a new code comprising a bitstream is generated, and the bitstream is overwritten on the plurality of tiles.

20 Claims, 9 Drawing Sheets

(56) References Cited

U.S. PATENT DOCUMENTS

| | | | |
|---|---|---|---|
| 7,349,527 B2 | 3/2008 | Yacoub et al. | |
| 7,424,672 B2 | 9/2008 | Simske et al. | |
| 7,455,013 B2 | 11/2008 | Simske et al. | |
| 7,466,234 B2 | 12/2008 | Simske et al. | |
| 7,469,833 B1 | 12/2008 | Kelley et al. | |
| 7,495,552 B2 | 2/2009 | Zhang et al. | |
| 7,499,591 B2 | 3/2009 | Simske et al. | |
| 7,543,745 B1 | 6/2009 | Simske et al. | |
| 7,581,242 B1 | 8/2009 | Oget et al. | |
| 7,628,330 B2 | 12/2009 | Tomita | |
| 7,660,019 B2 | 2/2010 | Gonzalez et al. | |
| 7,673,807 B2 | 3/2010 | Simske et al. | |
| 7,676,038 B2 | 3/2010 | Simske et al. | |
| 7,702,162 B2 | 4/2010 | Cheong et al. | |
| 7,712,665 B2 | 5/2010 | Ortiz et al. | |
| 7,734,554 B2 | 6/2010 | Simske et al. | |
| 7,830,557 B2 | 11/2010 | Simske et al. | |
| 7,840,028 B2 | 11/2010 | Simske | |
| 7,878,549 B2 | 2/2011 | Simske et al. | |
| 7,916,863 B2 | 3/2011 | Simske et al. | |
| 2001/0050308 A1* | 12/2001 | Paul | G06K 19/06028 235/375 |
| 2005/0269416 A1* | 12/2005 | Sussmeier | G06K 7/12 235/494 |
| 2009/0059307 A1* | 3/2009 | Matsumura | G06T 1/0071 358/3.28 |
| 2010/0149187 A1 | 6/2010 | Slavin et al. | |
| 2010/0155479 A1 | 6/2010 | Ming | |

* cited by examiner

200

300

(A)

(B)

600

ADAPTING AN INCREMENTAL INFORMATION OBJECT

BACKGROUND

Products may include both physical and information-containing items, such as produce, documents, labels, books, software, images, and the like. During the lifecycle of the product, it may progress through a workflow, such as from a manufacturer, through a chain of distributors, and on to a consumer. As used herein, a workflow is a defined set of stages, usually with task at each stage, which a product must pass through during its lifecycle. For example, a document may be drafted by a first person, then flow through a number of different editors, prior to being issued to customers or clients in final form. As another example, a manufacturer may package a product for sale to another manufacturer, such as a bundled software package to be sold with a computer.

A bar code may be associated with a product for numerous reasons. For example, a bar code may protect an associated product from counterfeiting and other falsifications. The same bar code may be used throughout the workflow to identify the product. However, this approach does not enable one to monitor the status of the workflow via the bar code. Multiple bar codes may be added, for example, by each entity within a workflow. This may be used to identify the product as it moves from one stage to the next in its workflow. For example, multiple barcodes may be used to confirm the identity of the last party to handle the product. However, the use of multiple bar codes may take a substantial amount of space.

BRIEF DESCRIPTION OF THE DRAWINGS

Features and advantages of embodiments of the present disclosure will become apparent by reference to the following detailed description and drawings, in which like reference numerals correspond to similar, though perhaps not identical, components.

DETAILED DESCRIPTION

Figure 1:
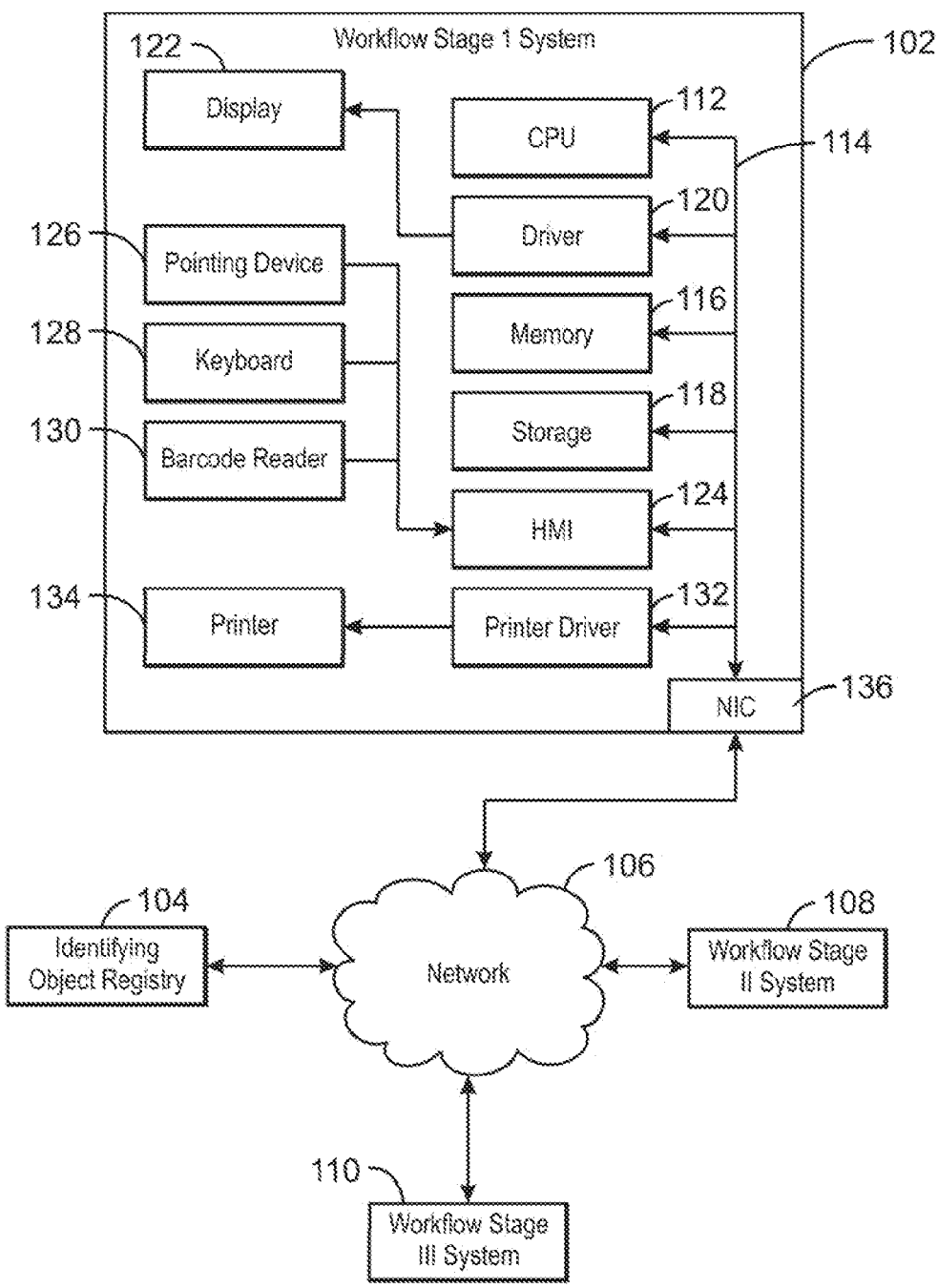
FIG. 1 is a schematic diagram of a system for changing an incremental information object (IIO) during a workflow, in accordance with an embodiment.

Embodiments discussed herein may be used to adapt a current incremental information object (IIO) to modifications in a workflow. As used herein, "adapt" indicates that the amount of information in the IIO may be increased or decreased to match the needs of the workflow. The information density of the IIO may be termed the complexity of the IIO. Thus, the complexity of an IIO may be changed to accommodate changes in the document's set of stages, security needs, and the like, and will work for both print-scan and wholly electronic workflows. This includes changing the overall number of writeable bits in the IIO, for example, by increasing or decreasing the complexity of the IIO.

The adaptability may be provided by changing the size of the individual data modules, or tiles, in the IIO, by changing the number of colors or grayscale levels allowed for the tiles, by changing the size of the real estate, within allowable formatting rules, devoted to the IIO, or by changing the size of the "data" portion of the IIO, such as by changing the relative amount of non-payload indicia (NPI) in the IIO. Any combinations of these techniques may also be used in embodiments. For example, the sizes of individual tiles used to store bits may be changed, or additional colors or intensities may be recorded in the IIO. Further, tiles initially used as NPI may be converted to carrying payload information (PI).

As described herein, a workflow is a defined set of stages, usually with one or more tasks at each stage, through which a product may pass during its lifecycle. In an embodiment, the workflow is a process during which documents, information, tasks, or products are passed from one participant to another for action or informative purposes, according to a set of procedural rules. Workflows may include any number of actions for processing the product. For example, a workflow for an image may include actions such as quality assurance, authentication, forensics, and the like. A supply chain workflow may include actions such as tracking, tracing, inspection, shipping, receiving, recall, among others. Workflows may also include other workflows. For example, a manufacturing workflow may include environmental workflows, sensor data monitoring workflows, compliance workflows, auditing workflows, and statistical workflows, such as inventory, average time in a stage, and the like. Thus, a workflow may be defined as a set of tasks associated with generating, implementing, producing, or distributing a product.

The number of stages in a workflow may need to be increased or decreased to adapt to changing conditions. For example, if sensor data indicates that a product has exceeded a temperature limit during shipping, the workflow may be terminated, decreasing the number of subsequent stages. Further, if a complication arises during an engineering design process, more stages may be added, such as additional design stages or review stages.

The IIO is a feature or mark carrying information that may be useful for tracing, tracking, state indication, data embedding, authentication, identification, or any other operations that may be used to provide information as a product progresses through the stages of a workflow. As used herein, all of these operations are encompassed by the general term "confirming." The IIO can maintain a size, a shape, or both, as the item moves through the workflow, even though information may be added at each stage of the workflow. The IIO may be designed taking into account security needs, the type of readers available, and other concerns, such as branding, fraud prevention, robustness to damage, and the like.

The IIO may be a glyph or mark that can be incrementally overwritten throughout the workflow to form an identifying object having increasing data content at each stage. For example, the IIO may include a binary barcode, in which the state of each tile in a field of tiles in a two dimensional matrix encodes a bit in a bitstream. The IIO may also include three dimensional (3D) grayscale barcode, in which a field of tiles in a two dimensional matrix encodes information and a grayscale state is used to encode a third dimension at each tile. As another example, the IIO may include a 3D color barcode, in which a field of tiles in a two dimensional matrix encodes information and a color state is used to encode a third dimension, e.g., multiple bits, at each tile.

Each state of the tiles may be readily distinguished from each other state. As discussed below, the states may include a black or white state, a number of grayscale intensities, from completely white to completely black, or a color. The tiles may include square shaped tiles, rectangular shaped tiles, triangle shaped tiles, rounded tiles, mixed shaped tiles, mixed sized tiles, non-uniformly shaped tiles, or combinations thereof. Each state of the IIO is determined by the set of tiles that have been written to at a given stage of the workflow.

The IIO may be a physical mark on a product, such as a printed document or a label on a package. Further, the IIO may be an electronic object in a document, which may be displayed as a mark on a viewing device. In this embodiment, the IIO may be printed with the product and can appear as a mark on a first page of a document.

The IIO may be read from either the physical object or from the viewing device using any image capture device, such as specialized handheld or mobile device, or a bar code reader. In some embodiments, a virtual bar code reader may be used to read the IIO from an electronic document, without using a physical device. In some embodiments, a software object may locate and extract the image from an electronic document. As used herein, the term "bar code reader" includes all of these devices or techniques.

FIG. 1 is a schematic diagram of a system 100 for changing an incremental information object (IIO) during a workflow, in accordance with an embodiment. The workflow may start at a first stage system 102. Any number of systems for stages in the workflow may be included, depending on the workflow. The first stage system 102 may access an identifying object registry 104, for example, over a network 106, to obtain initial codes for the IIO. The network 106 may be a local area network (LAN), a wide area network (WAN), or the Internet, and may include both public and private network segments, such as virtual private networks (VPN). Other information may also be provided, such as rules for changing the complexity, or information density, of an IIO, or a stream of bits that may be used to set initial entropy in the IIO, as discussed in further detail below. The first stage system 102 can be used to create the IIO, for example, by writing a number of entropy bits to the IIO, followed by writing a bitstream generated from the code provided by the identifying object registry 104 onto a set of tiles in the IIO, i.e., in a payload region as discussed herein.

As discussed herein, entropy bits are bits set in an IIO to provide an initial variability, or entropy, that may make the codes written onto the IIO harder to guess. The bitstream may be generated using any number of techniques. In an embodiment, a private key associated with the initiator of the first stage of the workflow may be used to encrypt the codes provided by the identifying object registry 104. More generally, a nonce can be used for initialization of the codes in the IIO to prevent known-plaintext attacks on the private key. As used herein, nonce is an abbreviation for "number used once," and is a random or semi-random number, issued during each authentication protocol to help prevent replay attacks based on prior communications. Private key hashing or other nonces could then be used for the subsequent workflow stages. Any number of other techniques to generate the bitstream may be used in various embodiments. In an embodiment, the initial code provided by the identifying object registry 104 may used as the bitstream and may be directly written to the IIO, for example, if all confirmation is performed against the identifying object registry 104. The subsequent codes may be generated using various techniques and relationships, as discussed herein.

Other stages of the workflow may have associated systems, such as the stage two system 108 and the stage three system 110 illustrated in FIG. 1. The first stage system 102 may be used to either coordinate the physical transfer of a product to the second stage system 108 or to directly transfer a product in electronic form. Similarly, the stage two system 108 may transfer or coordinate the transfer of the product to the stage three system 110. At each stage, information may be sent to the next stage's system to confirm the IIO. For example, the information may include the rules used to generate the code, the rules used to increase the complexity of the IIO at an earlier stage in the workflow, and the like. Stages, security levels, and the like, may be added or removed in the workflow by changing the complexity of the IIO. In an embodiment, the system at a particular stage can change the complexity of the IIO by communicating with the identifying object registry 104. In another embodiment, the complexity may be changed by following rules initially issued by the identifying object registry 104.

Any of the stage systems 102, 108, and 110, or the identifying object registry 104, may include units to provide the functionality used to generate the IIO, as shown for the first stage system 102. These units may include a central processing unit (CPU) 112. The CPU 112 may include a single core processor, a multi-core processor, or a cluster of processors, for example, in a cloud computing configuration. The CPU 112 may communicate with other units over a bus 114, which can include a PCI bus, a PCIe bus, an optical bus, or any other suitable type of bus.

A memory 116, such as random access memory (RAM) or read-only memory (ROM), may be used to store operating programs and data configured to implement the methods described herein. As used herein, programs include machine readable code configured to direct a processor to implement various functions. Similarly, a storage system 118 may provide longer term storage for data and programs. The storage system 118 may include, for example, a hard drive, an optical drive, a flash drive, a memory drive, and the like. The memory 116 and storage system 118 provide a non-transitory, computer readable medium for storing programs and data to implement the techniques described herein, as discussed further with respect to FIG. 10.

Other units may also be included to provide further functionality. For example, the stage systems may include a display driver 120 to drive a display 122, which may be used to display the product and the IIO. A human-machine interface (HMI) 124 can be used to interface with a number of input devices, such as a pointing device 126, including, for example, a mouse or touchscreen, among others. The HMI 124 may also provide an interface to a keyboard 128, a barcode reader 130, or both. A printer driver 132 may be used to interface with a printer 134 to print the IIO, the product, or both. The printer 134 may be a general purpose unit, such as a laser printer or an ink jet printer, or may be a dedicated unit configured to overprint an IIO with additional information. In addition, a network interface card (NIC) 136 may be provided to permit the stage systems to access the network, the NIC 136 may include a wired Ethernet interface, a wireless network interface, or a mobile network interface.

A number of possible workflow patterns may be implemented on the system 100 discussed above. For example, the workflow may follow the patterns discussed with respect to FIGS. 2 and 3.

Figure 2:
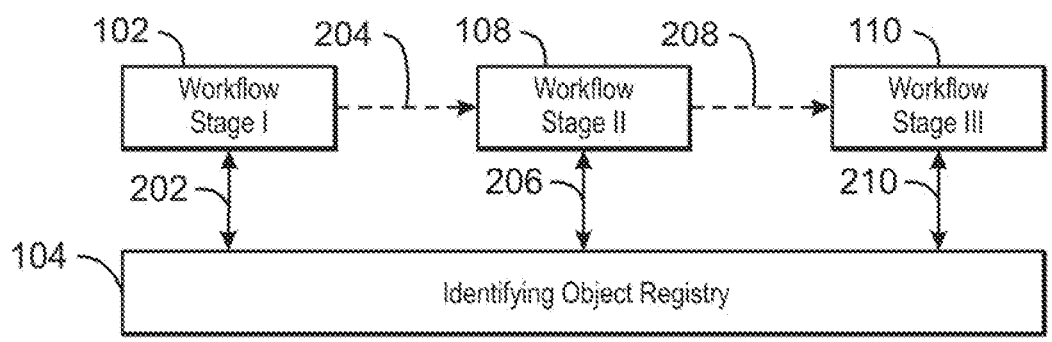
FIG. 2 is block diagram of a workflow using a centralized identifying object registry for confirmation of a product in accordance with an embodiment.

FIG. 2 is block diagram of a workflow 200 using a centralized identifying object registry for confirmation of a product in accordance with an embodiment. If the registry-based workflow 200 is utilized, a first stage system 102 exchanges information used to generate the IIO with the identifying object registry 104, as indicated by arrow 202. The information 202 may include the rules for generating the IIO, rules used to change the complexity of the IIO, any coded regions used for carrying additional information, any bits used for adding complexity (e.g., entropy) to the initial IIO, and the like. In an embodiment, the information 202 exchanged includes all of the information needed to write the IIO, with the identifying object registry 104 retaining all coding information.

At the next stage in the workflow 200, the second stage system 108 receives a package 204 of information from the first stage system 102. The package 204 may include a document and its associated IIO. In the case of a physical product, the package 204 may be physically transferred from one stage to the next in the workflow. The second stage system 108 may then confirm the IIO, for example, by decoding the image to form a bitstream including the code and then exchanging information 206, including the bitstream, with the identifying object registry 104 for confirmation of the information 206.

At any stage 102, 108, or 110 of the workflow 200, after confirmation of the previous code, the IIO may be changed in complexity, for example, to accommodate increases and decreases in the number of stages in the workflow 200. This can be performed by communicating the requested change to the identifying object registry 104 and receiving instructions for changing the IIO. Thus, the information 206 returned from the identifying object registry 104 may include information confirming the IIO and information for generating a simpler or more complex IIO for the next stage of the workflow. In an embodiment, the information 206 from the identifying object registry 104 may include all of the information used to directly form the IIO, including all of the changes in complexity.

To advance the workflow, the second stage system 108 sends a package 208 on to the third stage system 110. The package 208 may include a physical product as discussed for the package 204 transferred from the first stage system 102 to the second stage system 108. The third stage system 110 can then confirm the IIO by decoding the image to form a bitstream, and exchanging information 210 with the identifying object registry 104, including the bitstream, for confirmation of the IIO.

As discussed herein, the techniques are not limited to only three workflow stages, but may include any number of workflow stages, both in series and in parallel. In the embodiment shown in FIG. 2, the addition to the IIO, or changes in the complexity of the IIO, at each stage in the workflow 200 can be performed in conjunction with the identifying object registry 104. However, an independent incremental workflow may be utilized, without backward visibility in the workflow stage-stage transmission, as discussed further with respect to FIG. 3.

Figure 3:
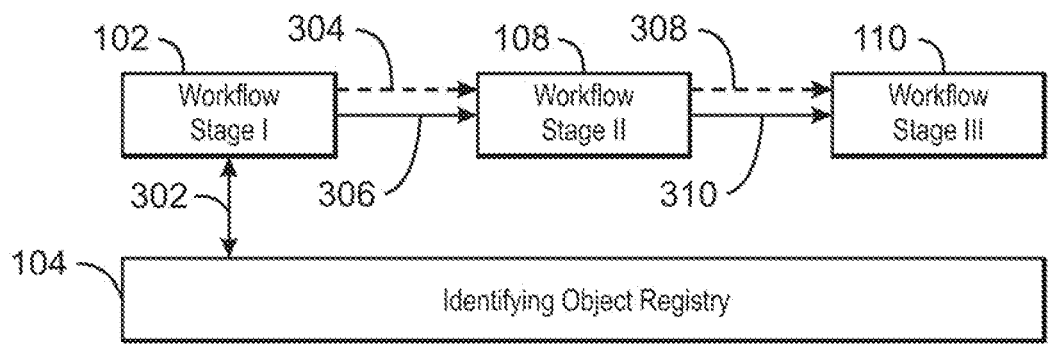
FIG. 3 is block diagram of a workflow that obtains initial codes and instructions from the identifying object registry and uses the systems at each stage of the workflow to confirm the product and make any changes to the complexity of the IIO, in accordance with an embodiment.

FIG. 3 is block diagram of a workflow 300 that obtains initial codes and instructions from the identifying object registry 104 and uses the systems at each stage of the workflow to confirm the product and make any changes to the complexity of the IIO, in accordance with an embodiment. In this embodiment, the first stage system 102 exchanges information 302 with the identifying object registry 104 to create the IIO at a first complexity level. As described with respect to FIG. 2, the information 302 may include the rules for generating the IIO, any bits used for adding entropy to the initial IIO, and the like. In addition, the information 302 may include rules for changing the complexity of an IIO at a stage of the workflow 300. In some embodiments, these rules may include creating a hash code of the bitstream decoded from a code region of the current object, using a private key to encrypt the hash code, writing a bitstream of the hash code over the associated code region of the current IIO, and sending the hash code on to the next work stage along with a public key for decryption. Other information may also be included, such as an encrypted version of the starting code, e.g., the code provided to the previous stage of the workflow, among others.

The IIO at each stage of the workflow can be deduced when the starting point is known, such as the initial or first code, as most workflows have a small and well-defined set of stages. Workflow exceptions may occur, however, when extra steps have been added, for example, in a non-legitimate progression. Similarly, exceptions may occur when available space for over writing successive codes becomes sparse during the workflow. In such instances, the stage of the workflow may not be deduced, and the IIO may fail the confirmation process. In an embodiment, the complexity of the IIO may be changed to accommodate workflow exceptions. Thus, instead of failing the confirmation process, legitimate changes may allow the workflow to continue to progress to completion.

At the next stage, the stage two system 108 receives the product 304 and the information 306 that may be used to confirm the IIO on the product. For example, the information 306 may include an intelligent hash of the previous state of the IIO from the first stage system 102, among other items, such as the rules used to modify the complexity of the IIO. In this embodiment, the stage systems may not have access to the identifying object registry 104, and the addition to the IIO at each stage in the workflow will be performed in conjunction with initial instructions received from the identifying object registry 104. This embodiment may be useful, for example, when the distribution network organization is proprietary.

After the work at stage two is completed, the stage two system 108 may forward the product 308, including the IIO, to the stage three system 110, along with the information 310 needed to confirm that earlier added information is correct. In an embodiment, the information includes rules for changing the complexity of the IIO to accommodate changes in the workflow.

As described herein, the identifying object registry 104 can include hardware, such as processors, memory, and storage. Further, the identifying object registry 104 and each of the workflow stage systems 102, 108, and 110, may include software for generating an incrementally completed IIO. Access to the identifying object registry 104 may be secure, for example, requiring a login and password or other authorization methods, such as biometric validation of identity, possession of a secure token, and the like. In an embodiment, the identifying object registry 104 may be unsecure, e.g., being publicly accessible.

In some embodiments, the system 100 may be hosted by a cloud computing network, which may be a virtualized bank of computers including servers that enable Internet-based computing. Shared resources, software, and information may be provided to various computing devices through the cloud computing network. The computing devices may include the workflow stage systems 102, 108, or 110, which may be stationary, such as desktop computers, or mobile, such as laptop computers, netbooks, cellular phones, personal digital assistants (PDAs), and the like. The cloud computing network may allow a registry system provider to deliver access to the identifying object registry 104 and its various services to subscribers online via another web service or software, such as a web browser. Software and data associated with the cloud computing network may be stored on servers and their associated memory.

Thus, as a result of the workflow described above, the IIO contains an incrementally increasing amount of information at each stage of the workflow. This is discussed with respect to FIG. 4.

Figure 4:
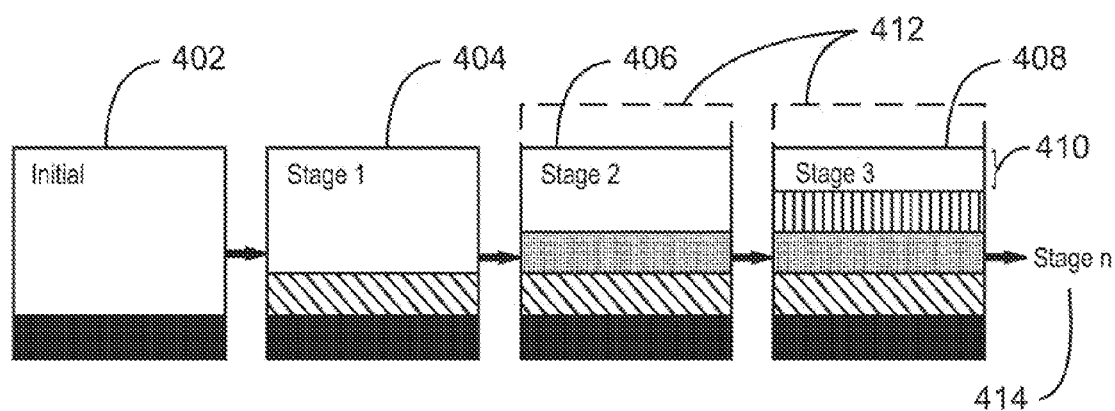
FIG. 4 is a schematic of changing the complexity of an IIO during a workflow, in accordance with an embodiment.

FIG. 4 is a schematic 400 of changing the complexity of an IIO during a workflow, in accordance with an embodiment. The IIO can have an initial number of bits set to provide entropy to the code, making it less probable that the code may be guessed. These entropy bits provide a first amount 402 of information in the IIO. At the completion of the first stage of the workflow at block 404, the IIO is overwritten and contains a second and increased amount of information in the IIO, which is transferred to the second stage of the workflow. After completion of the second stage of the workflow, at block 406, the IIO has a third and further increased amount of information. At block 408, the third stage of the workflow is completed, and the IIO contains a fourth amount of information. A portion 410 of the bits that may be written are left blank in the IIO, providing entropy for the final IIO.

In an embodiment, the amount of information contained in an IIO is changed at a stage 404, 406, or 408, to accommodate a change in the workflow. In the schematic 400, this could be represented by a change in the size of a block, for example, as shown by the large block 412. The increase in the size of the block 412 can allow more information to be stored in the IIO, providing the possibility of moving to further stages 414. Similarly, if the workflow can be legitimately terminated at an earlier stage, the blocks may be decreased in size, indicating less information may be stored in the IIO. To see the advantages provided by changing the information content of an IIO, it is useful to examine a simple two-dimensional IIO, as discussed with respect to FIG. 5.

Two-Dimensional (2D) IIOs

Figure 5:
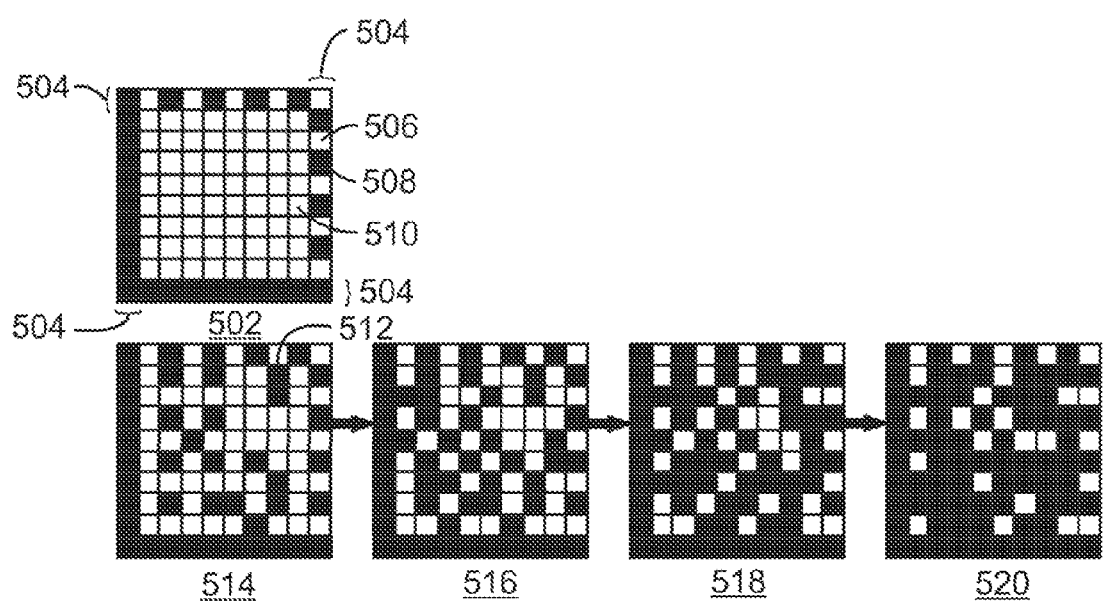
FIG. 5 is a schematic showing an example of changes to tiles that may occur in a two-dimensional (2D) IIO at each stage in a workflow, in accordance with an embodiment.

FIG. 5 is a schematic 500 showing an example of changes to tiles that may occur in a two-dimensional (2D) IIO at each stage in a workflow. A blank IIO 502 shows the presence of non-payload indicia (NPI), which can be used to convey basic identification and calibration information, including such information as the type of IIO being used, the number of gray values or color values that may be present, an arrangement for the gray values, and the like. In this example, the NPI include the perimeter tiles 504 on all four sides of the 2D IIO. The alternating light tiles 506 and dark tiles 508 along two edges of the perimeter, and the dark tiles placed along the other two sides, provide calibration marks for adjustment of the image, as described herein. The blank tiles 510 inside the 2D IIO are the payload tiles which may be changed from light to dark to indicate the presence of a bit value of one.

A number of entropy-introducing bits 512, for example, sixteen in this illustration, may be set to a value of one within the blank 2D IIO 502 to create an initial 2D IIO 514. The entropy-introducing bits 512 increase the variability of the initial 2D IIO 514, making it less probable that a code may be guessed. The initial 2D IIO 514 is passed to the first stage of the workflow, which writes the first bitstream over the initial 2D IIO 512, providing a first stage 2D IIO 516.

The writing to each of the code regions may be performed by any number of schemes. For example, the writing may be performed by initializing both a tile counter and a bit pointer to zero. The value of the first bit in the stream is compared to the value of the first tile. If the first tile is light (zero) and the first bit is one, the value of the first tile is changed to dark (one), and both counters are incremented. If the first tile is dark (one), and the first bit is one, the tile counter is incremented until a light tile is reached, at which point the value of the tile is changed to dark (one). At that point, both counters are incremented. If the first bit is zero, the tile counter and the bit counter are both incremented without changes to tiles. The process is repeated until all of the bitstream bits are used. If the tiles are completely examined, i.e., the tile counter exceeds the number of tiles, the tile counter is reset to zero, and the process continues until all bits are written.

The first stage 2D IIO 516 is then passed to a second stage of a workflow with the product. At the second stage of the workflow, the first stage 2D IIO 516 may be confirmed, for example, by comparing information in the code to rules used to generate the code or the IIO, by sending the code to the identifying object registry 104, or both. After confirmation, the code may be used in the creation of a second stage 2D IIO 518, for example, by writing a bitstream over the first stage 2D IIO 516. The process is repeated at the third stage resulting in the third stage 2D IIO 520.

A 2D IIO using light to dark binary transitions may provide a large number of state transitions, making the probability of guessing the one correct next state or falsifying the IIO very low. For example, the statistical probability associated with a stage i in the workflow may be defined as $P_i$. Thus, the number of residual (0 bits) at the end of the workflow is $N_{RB}$, and the number of initial unwritten bits is $N_{IU}$. The values of $N_{RB}$ and $N_{IU}$ used to achieve a particular value for $P_i$ are governed by the formula of Eqn. 1.

$$\frac{N_{IU}!}{(N_{IU}-N_{RB})!N_{RB}!} \geq \prod_i P_i \qquad \text{Eqn. 1}$$

In Eqn. 1, the exclamation mark (!) represents the factorial operator. $P_i$ may be determined from the required statistical confidence that a next step cannot be randomly guessed multiplied by the total number of IIOs of the current state that will be readable in the supply chain, among others. If the IIO is unique at step i-1, then the total number of IIOs of the current state is 1.

As an example, consider a case in which a 2D IIO is initially 25% filled with black tiles and upon completion of its workflow it is 75% filled with black tiles. For purposes of this example, it can be assumed that there are six stages in the workflow: a manufacturer, four distributors, and an end retailer. Further, for the purposes of the supply chain, it can be assumed that the desired statistical $P_i$ values are $10^9$ for manufacturer and the four distributors and $10^3$ for the retailer. Thus, the $$\prod_i P_i$$

value is about $10^{48}$.

Suppose a number of bits in each of a number of bitstreams are represented by {g,h,i,j,k,l}, wherein each of the bitstreams are used to move the product through a particular stage of the workflow. The final number of bits, $N_{RB}$, is assumed to be ⅓ of the original unwritten bits, $N_{IU}$. Accordingly, the governing equations for each step in this workflow are:

$$\frac{N_{IU}!}{g!(N_{IU}-g)!} \geq 10^9 \qquad \text{Eqn. 2}$$

$$\frac{(N_{IU}-g)!}{h!(N_{IU}-g-h)!} \geq 10^9 \qquad \text{Eqn. 3}$$

$$\frac{(N_{IU}-g-h)!}{i!(N_{IU}-g-h-i)!} \geq 10^9 \qquad \text{Eqn. 4}$$

$$\frac{(N_{IU}-g-h-i)!}{j!(N_{IU}-g-h-i-j)!} \geq 10^9 \qquad \text{Eqn. 5}$$

$$\frac{(N_{IU}-g-h-i-j)!}{k!(N_{IU}-g-h-i-j-k)!} \geq 10^9 \qquad \text{Eqn. 6}$$

$$\frac{(N_{IU}-g-h-i-j-k)!}{l!(N_{IU}-g-h-i-j-k-l)!} \geq 10^3 \qquad \text{Eqn. 7}$$

Note that $(N_{IU}-g-h-i-j-k-l)!$ in Eqn. 7 is the same as $N_{RB}!$, and so simplifying Equations 2-7 together gives Eqn. 8.

$$\frac{N_{IU}!}{g!h!i!j!k!l!N_{RB}!} \geq 10^{48} \qquad \text{Eqn. 8}$$

Eqn. 8 is in similar form to Eqn. 1. With Eqn. 8, we can compute the overall number of bits required in the 2D barcode (and by extension at each step in the workflow).

Assuming g!=h!=i!=j!=k!, the equation simplifies to:

$$\frac{N_{IU}!}{(g!)^5 l! N_{RB}!} \geq 10^{48} \qquad \text{Eqn. 9}$$

Even with governing Eqns. (2)-(9), there are still a large set of solutions to this problem. It can be assumed that $g \leq h \leq i \leq j \leq k$, since they represent the number of open bits to achieve a given number of bits at a particular stage. Further, $k \gg l$ in this particular example. However, it can be determined from above that with N payload elements (bits), there are $2^N$ different states of the overall payload, and, so, the minimum number for N is such that $2^N \geq 10^{48}$ or more and, thus, $N \geq 160$. Because barcodes are generally represented as N×N where N is an even number, N=14 has been selected for this example, in other words, giving a tile area of 14×14 for the information payload, i.e., not including tiles used for NPI. This provides $2^{192}=6.277\times10^{57}$ states, which is sufficient to accommodate the state changes {g,h,i,j,k} above, but not enough to accommodate the initial fill and final fill tiles, for example, used for the entropy bits. Thus, a 2D security code may be selected with a 16×16 matrix of 256 tiles. In this state, 32 tiles may be filled as the starting condition and 224 filled as the final fill. This means there are 192 bits to fill in between, with an additional statistical advantage of having 224 to choose from on the first step {g}.

To match the desired probabilities, the steps {g,h,i,j,k} may be given 36 bits each, with {l} as 12 as an initial guess for the last step. Thus, for the last step, {l}, 44 remaining open tiles can move to 32 open tiles, and so the governing statistics are $44!/12!32!-2.1\times10^{10}$, which is well above the required $10^3$. For {k}, the governing statistics are $80!/36!44!=7.2\times10^{22}$, which is well above the required $10^9$. For {g,h,i,j}, the statistics are even better—for {j} it is $116!/36!80!=1.27\times10^{30}$, for {i} it is $1.0\times10^{35}$, for {h} it is $5.5\times10^{38}$, and for {g} it is $5.5\times10^{41}$. This demonstrates that the number of state transitions is much higher than the number of states. In this case, Eqn. 10 applies.

$$\frac{N_{IU}!}{(g!)^5 l! N_{RB}!} = 6.23 \times 10^{178} \qquad \text{Eqn. 10}$$

A smaller 2D IIO may also be used. For example, if the 2D IIO is limited to a 12×12 matrix of payload tiles, $N_{IU}$ may be selected as 136, so there are $3.76\times10^{12}$ initial states using 8 bits to define the initial state, and $2.09\times10^{13}$ final states using 16 bits to define the final state. The remaining 120 bits for {g,h,i,j,k,l} use {22,22,22,22,22,10} bits each, providing $1.28\times10^{25}$, $1.8\times10^{23}$, $9.2\times10^{20}$, $8.6\times10^{17}$, $2.74\times10^{13}$ and $5.1\times10^6$ state transitions, respectively. So, here, for this smaller 2D IIO Eqn. 11 applies.

$$\frac{N_{IU}!}{(g!)^5 l! N_{RB}!} = 2.69 \times 10^{107} \qquad \text{Eqn. 11}$$

Another way to obtain a smaller IIO is to encode multiple bits into each tile. In an embodiment, this is performed by using multiple levels of darkness or multiple colors to represent levels in a single tile, increasing the number of bits each tile represents. This is further discussed with respect to FIG. 6.

Figure 6:
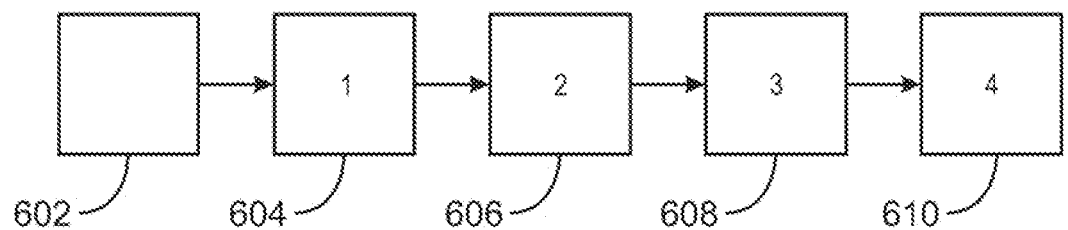
FIG. 6 is a schematic illustrating the use of a multi-level gray or color scale to increase the information content of a single tile, in accordance with an embodiment.
Figure 6:
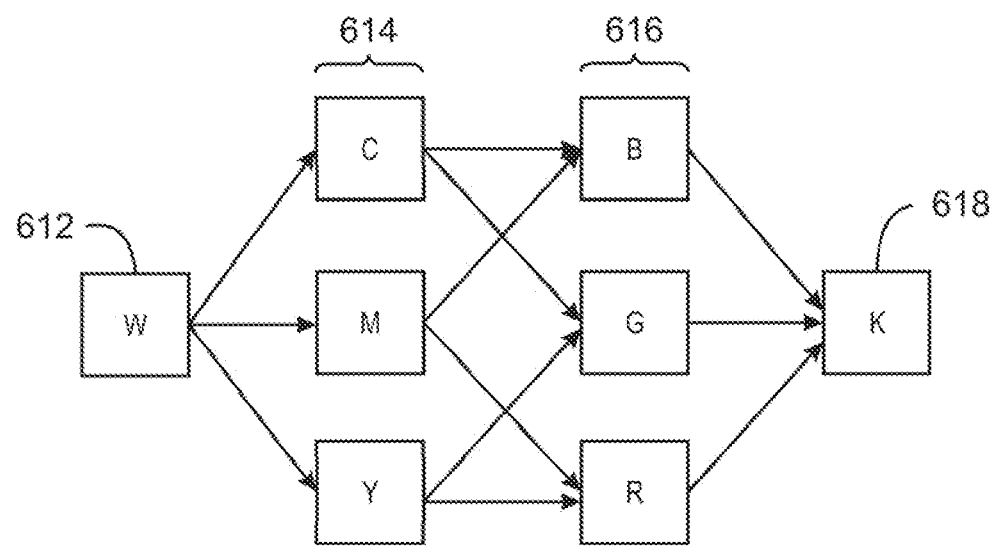

FIG. 6 is a schematic 600 illustrating the use of a multi-level gray or color scale to increase the information content of a single tile 602 or 612, in accordance with an embodiment. In FIG. 6(A), each time a bit value of one is written to the tile, the grayscale intensity may be increased by 25%, for example, going from white to 25% gray at the first bit, as indicated by the second tile "1" 604. Another bit value of one may increment the intensity to 50% gray for the second bit in a third tile "2" 606, to 75% gray for the third bit in a third tile "3" 608, to 100% gray, i.e., black, for the fourth bit in a fourth tile "4" 610.

The use of the grayscale changes the IIO to a three dimensional IIO. It can be noted that the grayscale values are not limited to 4 intensity levels, as any number of intensity levels may be used, so long as they can be clearly distinguished. In general, N possible states for a single tile may store Log(N)/Log(2) bits in that tile. Thus, the use of four intensity levels in addition to a white base level increases the information density of the IIO by 2.3 in comparison to the 2D IIO discussed with respect to FIG. 5.

A similar increase in information content may be realized by using a color scale, as shown in FIG. 6(B). In this example, a white tile may encode a bit value by being changed to any one of a first set 614 of colored tiles, e.g., a cyan tile "C", a magenta tile "M", or a yellow tile "Y". The colors for the first set 614 of tiles may be adjusted to reach more complex colors in a second set 616, for example, by overlaying a tile in the first set 614 with different tones or hues. Thus, a C colored tiled in the first set 614 may be adjusted to be either a blue "B" tile or a green "G" tile in the second set 616. Similarly, an M colored tile may be adjusted to be either a B colored tile or a red "R" colored tile in the second set and a Y colored tile may be adjusted to be either a G colored tile or an R colored tile. Further, each of the tiles in the second set 616 may be adjusted by the addition of a final tone or hue to be a black "K" colored tile.

As for the grayscale tiles, the use of the colored tiles changes the IIO to a three dimensional IIO. Although eight colors are shown, any number of colors may be used, so long as they may be clearly distinguished by the imaging device. As the eight different colors may encode eight bits, the information density of the IIO increases by a factor of Log(8)/Log(2)=3 in comparison to the 2D IIO discussed with respect to FIG. 5.

In embodiments, the amount of information stored in an IIO is changed by converting a binary IIO, e.g., using dark and light tiles, to a grayscale or color IIO by writing different colors or intensities. This is discussed further with respect to FIG. 9.

Figure 7:
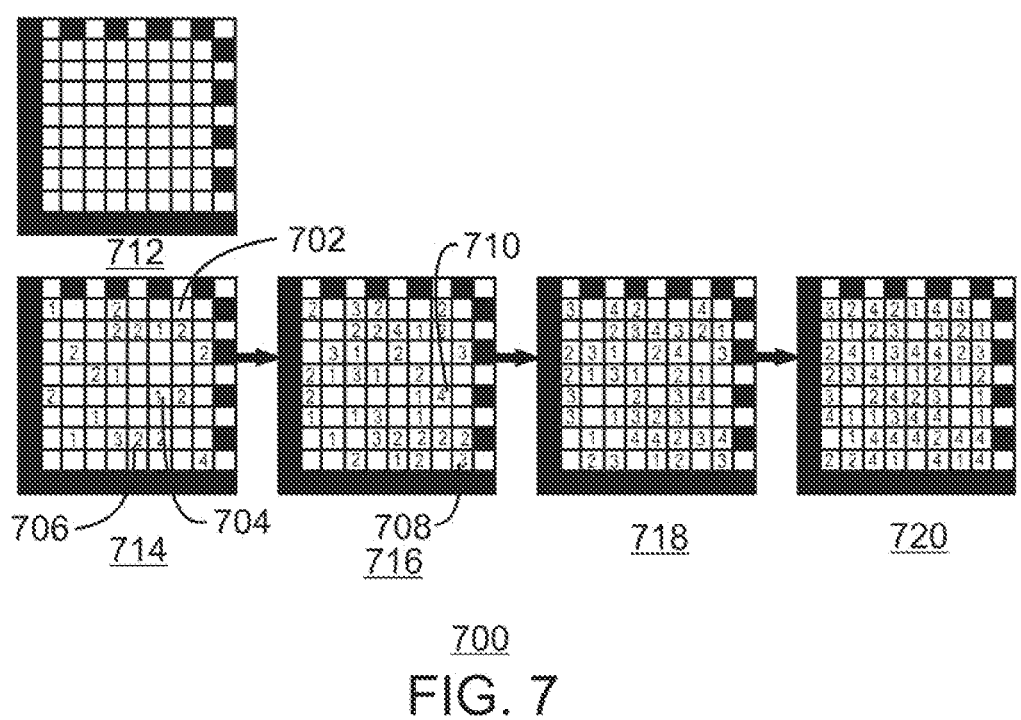
FIG. 7 is a schematic showing an example of changes to tiles that may be seen in combining a two-dimensional IIO, as shown in FIG. 5, with a multi-level gray scale for each tile, as shown in FIG. 6(A), in accordance with an embodiment.

FIG. 7 is a schematic 700 showing an example of changes to tiles that may be seen in combining a two-dimensional IIO, as shown in FIG. 5, with a multi-level gray scale for each tile, as shown in FIG. 6(A), in accordance with an embodiment. Throughout FIGS. 7 and 8, tiles with no number 702 are white tiles, tiles bearing a "1" 704 are at 25% intensity, tiles bearing a "2" 706 are at 50% intensity, tiles bearing a "3" 708 are at 75% intensity, and tiles bearing a "4" 710 are at 100% intensity, i.e., are black. The numbers also correspond to the number of bits, having a bit value of one, which have been written to a tile. Similar changes are seen when using the color scale of FIG. 6(B).

In this example, the blank IIO 712 may have 20% of the available storage space overwritten with entropy bits, forming the initial IIO 714. During the first stage of the workflow, the initial IIO 714 may be overwritten with a bitstream taking another 20% of the available storage space in the resulting first stage IIO 716, which is 40% full. Similar changes in the available storage space may occur after the second stage of the workflow, resulting in a second IIO 718 that is 60% full, and after the third stage, resulting a third IIO 720 that is with 80% full. The remaining 20% may be left blank to provide entropy to the third IIO 720.

The amounts used herein at each stage of the workflow are merely examples, as any percent completion may be used, such as calculated for the two-dimensional IIO discussed with respect to FIG. 5. Further, it may be possible to accommodate having an IIO where the step to step statistics are substantially evenly matched so that the security levels are as identical as feasible throughout the workflow. In an embodiment, the amount of information that can be stored in the IIO is changed to accommodate a change in the number of stages in a workflow.

Figure 8:
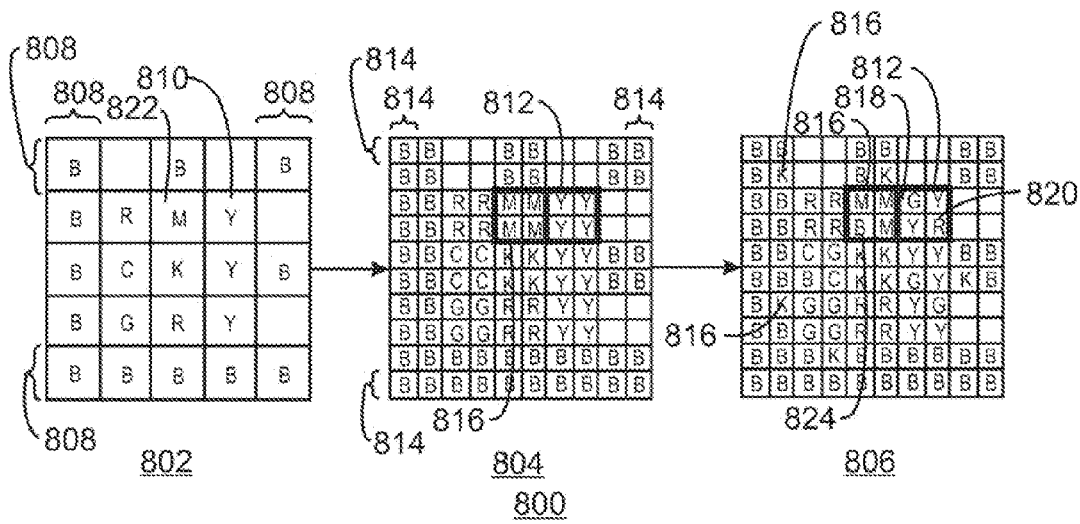
FIG. 8 is a schematic of an IIO showing an example of changes to tiles that may be made to increase the information density of an initial IIO to form a more complex IIO that may be overwritten to form a new IIO in accordance with an embodiment.

FIG. 8 is a schematic 800 of an IIO showing an example of changes to tiles that may be made to increase the information density of an initial IIO 802 to form a more complex IIO 804 that may be overwritten to form a new IIO 806, in accordance with an embodiment. In the schematic 800, data is stored in each of the IIOs 802, 804, and 806 using the color sequence described with respect to FIG. 6. The techniques described with respect to the schematic is not limited to this color sequence, or, indeed, any color sequences as they are equally applicable to IIOs written using grayscale sequences or binary (two-dimensional) IIOs.

In the initial IIO 802, perimeter tiles 808 represent non-payload indicia (NPI). In this example, the NPI are in blue (B), although any combinations of colors may be used. The payload tiles, inside the perimeter tiles 808, already have information written to them, which may indicate that the initial IIO 802 has progressed through a stage in a workflow. In an embodiment, upon determining that the workflow has changed, e.g., due to an increase in the number of subsequent stages, the tiles are divided into smaller tiles. Since the initial IIO 802 may generally be overwritten to form successive IIOs, each of the smaller tiles formed from an original larger tile may be the same color as the original larger tile. Each of the smaller tiles may then be used to individually encode subsequent bits. For example, a tile 810 in the initial IIO 802 may be divided into four smaller tiles 812 in the second IIO 804.

The NPI 808 along the perimeter of the first IIO 802 may also be divided into smaller tiles forming a new perimeter of NPI tiles 814 in the second IIO 804. In some embodiments, only the payload tiles are divided and the NPI 808 are left unchanged.

As mentioned above, the initial IIO 802 may be mapped to the more complex IIO 804, giving the smaller tiles colors that correspond to the original large tile colors. This may be useful when a direct overwriting of the initial IIO 802 may be useful, such as in an overprinting situation. However, for electronic documents, such a function may not be needed as the initial IIO 802 may be completely replaced with the second IIO 804.

Each of the smaller tiles may then be individually overwritten with new colors to carry additional bits. For example, in the third IIO 806, two regions of four smaller tiles 812 and 816 are highlighted by bold lines. The first four smaller tiles 812 in the complex IIO 804 derive from a tile 810 in the initial IIO 802 that was yellow. After division, the four smaller tiles 812 could each encode two more bit values, e.g., Y→(B,G,R)→K. In this example, a single bit is overwritten onto two of these tiles in the third IIO 806, i.e., the smaller green tile 818 and the smaller red tile 820. Before the division, each of the larger tiles of the yellow tile 810 in the initial IIO 802 could encode two bits. However, after the division, each of the four smaller tiles 812 could encode the same two bits.

The second set of four smaller tiles 816 was originally a single magenta tile 822 in the initial IIO 802. After the division of the tiles into the four smaller tiles 816, each smaller tile may also be magenta, as shown in the more complex IIO 804. Each of these smaller tiles 816 may then be individually overwritten with successive colors, such as M→(B, R)→K, as discussed with respect to FIG. 6. This is illustrated in the third IIO 806 by a smaller tile 824 that has been overwritten to become blue. Thus, using smaller tiles, 2×2×2×2 or 16 bits code be encoded into a region that could initially hold only two more bits. Accordingly, a large increase in information density will be seen for the change from the initial IIO 802 to the more complex IIO 804. The amount of the increase will depend on how much information is already encoded into each tile in the first IIO 802.

The number of tiles can be increased to change the information density when additional workflow stages, security, and the like, are used. The information density may also be reduced, e.g., by combining tiles, when workflow stages are no longer required, or re-formatting is useful due to issues with size, aesthetics, etc.

Figure 9:
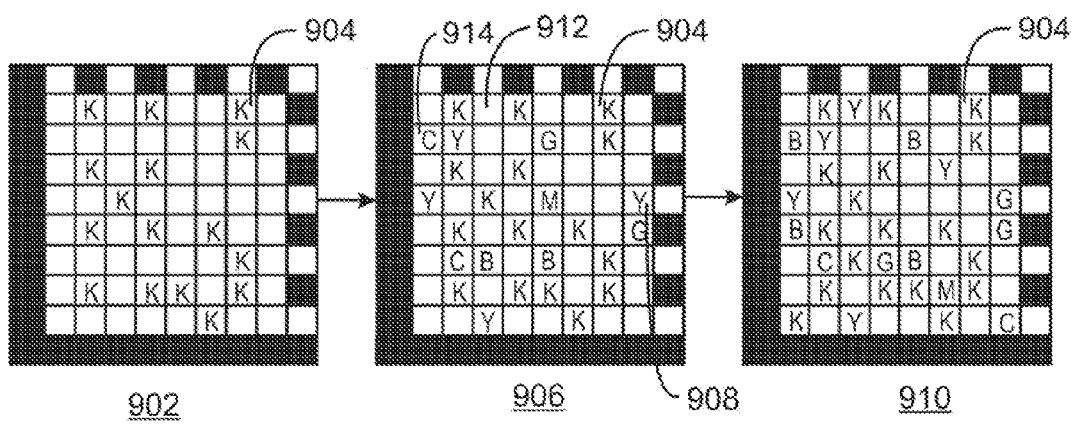
FIG. 9 is a drawing of the use of adding a color to a binary IIO to increase the storage density of the IIO, in accordance with an embodiment.

FIG. 9 is a drawing of the use of adding a color to a binary IIO to increase the storage density of the IIO, in accordance with an embodiment. In this technique, a two-dimensional IIO, in which a tile represents a single bit, may be converted to a three-dimensional IIO, in which a tile can represent multiple bits. This real-time adjustment of an IIO may be performed by increasing or reducing the number of colors or intensity levels allowed for the individual tiles. Thus, the number of allowable levels can change to adapt to the needs of the workflow. For example, a {CMY}, or {cyan, magenta, yellow} progressive barcode can be altered to include {RGBCMY}.

For example, a two-dimensional (2D) IIO 902 may have a bit sequence written using a binary encoding, e.g., using black ("K") tiles 904 to represent a bit. In an embodiment, subsequent tiles may be written with a color, as described with respect to FIG. 6. Thus, writing another bit sequence may result in a first three-dimensional IIO 906, having the original black tiles 904 from the 2D IIO 902 and color tiles 908, which can encode three bits each. Subsequently, a further bitstream may be overwritten onto the first 3D IIO 906, resulting in a second 3D IIO 910, which has information written to both blank tiles 912 in the first 2D IIO 906 and to colored tiles 914 in the 2D IIO 906, resulting in a significant increase in information density.

Other techniques may also be used to increase the information density of an IIO. A real-time adjustment of an IIO to adapt to a change in the workflow may be made by changing the size of the real estate devoted to the IIO, within allowable formatting rules. This may be performed, for example, by writing information into the NPI blocks, or past the NPI blocks. However, the real-estate used for the IIO is generally fixed before the start of the workflow. The NPI may also be converted to carry a payload.

Figure 10:
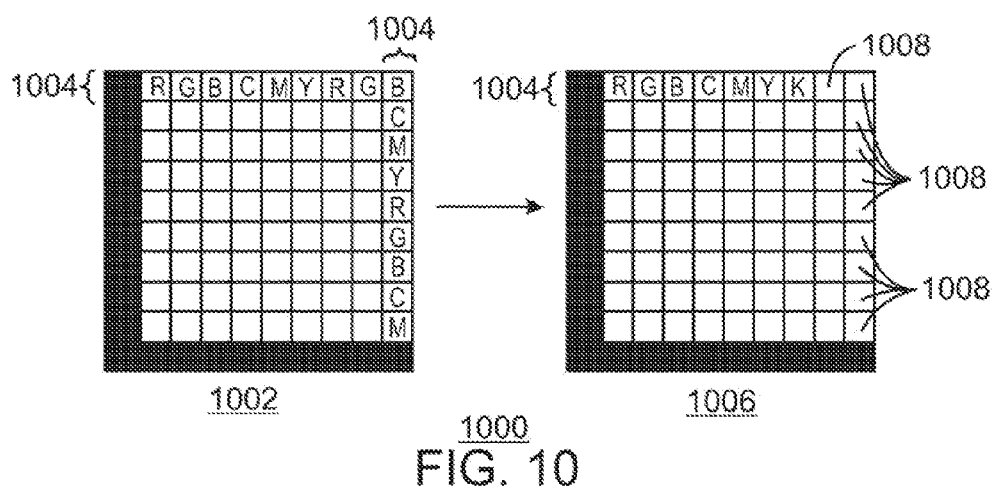
FIG. 10 is a schematic showing the conversion of non-payload indicia (NPI) to payload indicia, in accordance with an embodiment.

FIG. 10 is a schematic 1000 showing the conversion of non-payload indicia (NPI) to payload indicia (PI), in accordance with an embodiment. As shown in the schematic, a first IIO 1002 may have NPI that includes perimeter tiles 1004 in a sequence of colors, RGBCMYRGBCMYRGB. These perimeter tiles 1004 may be used for functions such as color calibration. As shown in the second NPI 1006, the color sequence in the perimeter tiles 1004 may be cropped to RGBCMYK, in which a red tile is changed to a black or "K." This black tile is the NPI "stop codon," which indicates the end of the NPI sequence. Thereafter, the tiles 1008 beyond the stop codon, i.e., those tiles previously colored GBCMYRGB, can be changed to white tiles and become PI.

Any number of other techniques may also be used to convert NPI tiles to PI tiles. For example, if alternating blue tiles and white tiles indicate NPI in a single color IIO, then the blue tiles may be overwritten with black to store PI. Further, the white tiles that are alternated with the blue tiles of the NPI may be overwritten to store additional PI, e.g., using a full set of colors as discussed with respect to FIG. 6.

Figure 11:
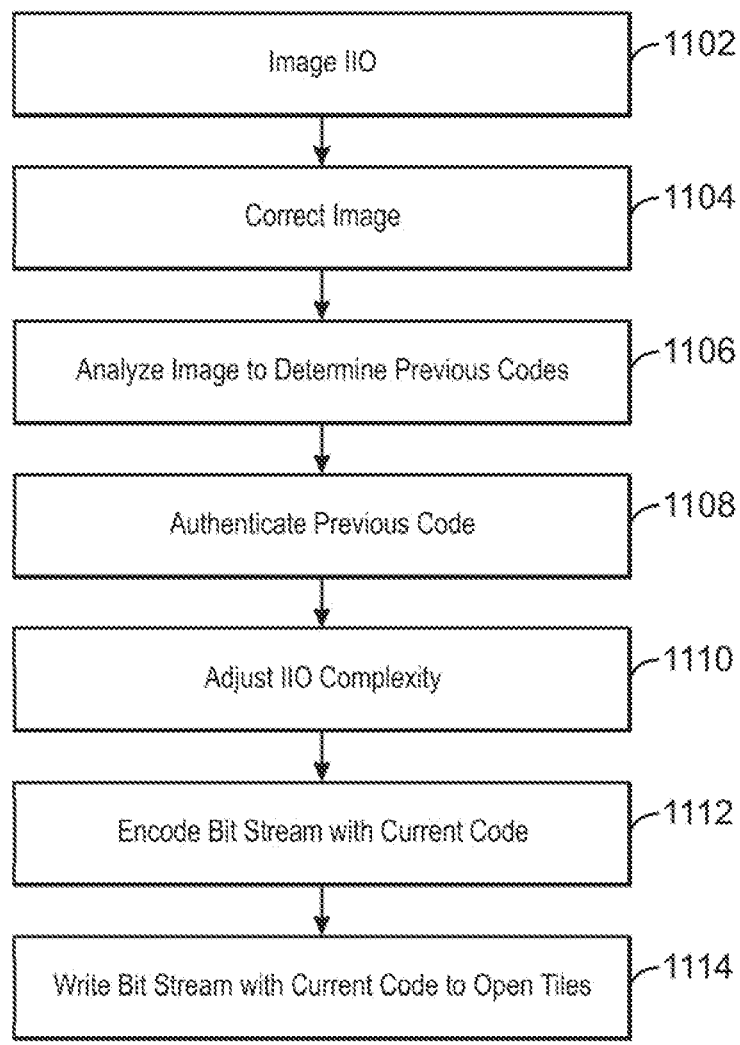
FIG. 11 is a flow diagram of a method for generating an IIO in accordance with an embodiment.

FIG. 11 is a flow diagram of a method for generating an IIO in accordance with an embodiment. Referring also to FIG. 1, prior to configuring the system 100 and its various components to generate an IIO, the expected number of stages in the workflow can be set and a number of bits to write in total and during each state of the workflow can be selected. In some instances, however, the number of bits may be dynamically determined at any stage in the workflow. For example, if additional bits need to be added for security at a stage of the workflow that takes place outside of a secure environment. In one embodiment, an IIO may be selected first and then the workflow and number of bits may be designed around the selected IIO. In another embodiment, the workflow and the number of bits may be selected, and then the IIO may be selected to fit the specifications of both the workflow and the total number of bits to be carried. In an embodiment, the information density of the IIO may be adjusted during the workflow to accommodate a change in the number of stages, security needs, and the like.

In embodiments in which the IIO is selected after the total number of bits is identified, the identifying object registry 104 may consider the total number of bits to be written to the IIO and whether it is desirable to include entropy in the identifying object. At this stage, other considerations may also be taken into account, such as to include non-payload indicia in the identifying object, the number of code regions to be used to form the IIO, and the relationships between the code regions.

The probability of guessing the initial state with less than a specified statistical probability may be added prior to the initiation of the workflow by partially filling available tiles of the IIO. It can be understood that a partially completed state of the IIO has greater security, statistically, than an all-white state of the IIO.

The introduction of non-payload indicia (NPI) may also affect the size of the IIO because non-payload indicia are included in tiles of the IIO that may have otherwise been written to with bits. As described above, NPI do not contain bits, but rather are used for calibration, for example, to correct skew, calibrate intensity, and calibrate orientation of the IIO, at each stage in the workflow. NPI may also be used for branding, symbology identification, or the like. When it is desirable to include NPI, the number of tiles to be used for the NPI may be accounted for in the total number of tiles that are used for the IIO.

In one embodiment, the IIO, the code regions, the workflow, and the number of bits are created at the identifying object registry 104. The identifying object registry 104 includes a non-transitory, computer-readable medium with a computer program for selecting the IIO, a number of stages in the workflow, a security level for each stage in the workflow, and a number of bits to be written at each stage in the workflow. The number of elements may be preselected before the workflow is initiated or dynamically determined as the workflow is in progress.

The workflow and preset number of bits may be set or defined using information received at the identifying object registry 104 from one or more participants in the workflow.

For example, a product manufacturer may request that a workflow be set up for a particular product, and may provide information to define the workflow, including such information as the distributor, the retailer, and product identification information, such as the serial number. The identifying object registry 104 may then select a suitable IIO, generate a suitable workflow, and preset code region information to be stored in the IIO. The IIO design and the preset number of bits may also be set by the workflow and, thus, can be accessed (or looked up) using a number of methods.

In the embodiment described with respect to FIGS. 1-5, the workflow may initially involve three stages, for example, a manufacturer, a distributor, and a retailer. At each stage, the workflow may require an individual to sign a document, such as by overprinting the IIO associated with the product, prior to shipping the product and document to the next entity, and may require an individual receiving end to sign the document upon receiving the product and document.

As described herein, the number of bits to write to the IIO at each stage of the workflow is proportional to the desired minimum level of security, on a statistical basis, at any given stage. High-level security stages may write more bits of information to the IIO, while low-level security stages may write less bits of information to the IIO. The number of bits to encode at each stage of the given workflow may be based on probability. For example, the number of bits can be chosen so that a given level of confidence is achieve so that the next state of the IIO has less than a p probability of being guessed.

Hamming distance may also be used in the determination of the number of bits. As described herein, Hamming distance is the sum of bits, defined in the elements of the IIO that are different from one stage to the next. Any associated mark that is used in concert with the IIO may also be used to determine the number of bits, as an associated mark may increase the complexity of the IIO, making guessing a code in the IIO less probable.

Once the workflow is generated, including the various stages and the number of bits to be encoded in total and at each stage, and the IIO is selected, the workflow is initiated. The workflow instructions may be transmitted electronically to at least the first stage system 102. The instructions may include, for example, the procedural rules for the transmission of the product, the actions, or purposes associated with the product, and either the total number of bits to encode or the number of bits to encode in the product's IIO at each stage in the workflow. Further, the workflow instructions may include rules for creating the individual code regions in the IIO.

In one embodiment, the systems used during subsequent stages in the workflow receive the instructions from the first stage system 102 or from a system used in previous workflow stage. In another embodiment, the systems 108 or 110 used during subsequent stages in the workflow may retrieve the instructions from the identifying object registry 104, for example, via a network 106. In another embodiment, the workflow may be initiated without transmitting the workflow instructions. For example, the document and its associated IIO may be transmitted to the first stage system 102 in the workflow. It is to be understood that as long as the starting point of the workflow is known, one can deduce each stage of the workflow.

The method starts at block 1102 by imaging an IIO. The imaging may be performed by a bar code reader 130, a software object, a scanner, a camera, or any other suitable imaging device or code. The IIO is isolated or segmented from the surrounding content, such as by the use of non-payload indicia (NPI) that delineate the edges of the IIO. At block 1104, an image correction and calibration is performed. Calibration may involve orienting the IIO using the non-payload indicia, dewarping the IIO, deskewing the IIO, calibrating the possible intensity levels, and the like. The calibration may be performed in conjunction with interpretation of the IIO, or calibration may be performed and then interpretation of the IIO may be performed.

At block 1106, the image may be analyzed to determine the previous code in the IIO. The codes may then be identified by incrementally determining the bits written to the tiles to generate a bitstream. For example, the bitstream may be determined by reversing a procedure used to write the bits. The bitstream may then be decoded using a public key to decode a bitstream encoded with a corresponding private key. Any number of techniques may be used to encode and decode the data between workflow stages, including the private/public key system, generation of an encoded numerical hash of the code, and the like. Further, in some embodiments, an identifying object registry 104 may be used to confirm the bitstream without further decoding, such as if the IIO effectively stored a secret string, nonce, or the like.

At block 1108, the code may be confirmed to validate the identity of the document, or product, and the previous stage. For example, this may be performed by querying the identifying object registry 104 with the bitstream. In some embodiments, the confirmation may be performed by comparing the decoded value to an expected value at a local stage system.

At block 1110, if more complexity is needed in the IIO, for example, due to added stages or higher security needs, the information density of the IIO may be adjusted. The adjustment may be performed using any number of techniques. For example, as discussed with respect to FIGS. 8 and 9, these techniques may include dividing tiles into smaller tiles, adding color to an IIO, increasing the number of colors in an IIO, adding grayscale tiles to an IIO, or increasing the size of the IIO, among others. Furthermore, any combinations of these techniques may also be used to increase the information density of an IIO.

Once the complexity of the IIO has been adjusted, at block 1112, a new bitstream may be generated, for example, related to the current workflow stage. The new bitstreams may include an encrypted version of a hash, for example, generated using a private key. In some embodiments, a new bitstream for a code is obtained from an identifying object registry 104 along with instructions for writing the more complex IIO.

At block 1114, the new bitstream may be written over the IIO. The stage system 102, 108, or 110 performing the incremental writing may determine the location of remaining available candidate areas that can be written to, for example, tiles that are not already carrying NPI or are not full. The open tiles may include tiles generated by an increase in the complexity of the IIO. A variety of algorithms may be used to determine where to place the information, which may include a preset number of bits. Non-limiting examples of these algorithms include scrambling, random/nonce, one-time-pad, encryption, data replication, etc. These techniques identify where the information can be added to the IIO. This may include identifying open tiles for data and writing the bitstream to the open tiles.

In one embodiment, after the available candidate areas in the code region, or payload tiles, are identified, the first stage system 102 identifies or retrieves the preset number of bits, for example, from the workflow instructions, to be written.

In some embodiments, the number of bits to be written at a particular stage may be determined automatically by the stage system 102, 108, or 110 performing the incremental writing or by a user. In these embodiments, the total number of bits to be encoded throughout the workflow is known, and the stage system 102, 108, or 110 at each workflow stage would add a suitable amount of information to the IIO. For example, a string containing 0's and then 1's incrementally to be written could be stored as a nonce and then the 1's would be incrementally written to the IIO stage by stage. As described herein, in an embodiment, the amount of information that can be stored in the IIO is increased by increasing the complexity of the IIO.

When determining how to write the information, the stage system 102, 108, or 110 will use the information from segmentation to identify the then-current intensity levels, color levels, and the like, of the available candidate areas in the IIO. When determining how to write the information, the stage system 102, 108, or 110 will select a scrambling technique, if any, by identifying an algorithm to be used for incorporating the information for the current workflow stage. This algorithm may be random or nonce-based, or may be deterministic.

In instances where the workflow 200 is based on the identifying object registry 104, as discussed with respect to FIG. 2, the previous state of the IIO may be replicated using the network 106, so that random or nonce methods are valid when inputting new information. For example, the information to be added is provided by a random number generator and is stored in the identifying object registry 104. In this example, the newly added bits are randomly added, and the identifying object registry 104 can provide and store the random new bits.

In instances where the independent incremental workflow 300 is used, as discussed with respect to FIG. 3, each workflow stage may use an intelligent hash of the previous state of the code in the IIO. In this example, a deterministic approach may be used, in which the newly written information is determined from the current state of the IIO and any additional pre-populated information that distinguishes the IIO from other IIOs on the product, such as SKU specific information and mass serialization information. In one embodiment, the IIO may be pre-populated with the SKU specific information and mass serialization information to ensure each IIO is unique. In another embodiment, if a document has other unique information, such as a routing number or another barcode/stock identifier for point of sale, the other unique information can be included in a digital signature, such as the output of an operation on a binary string using a private key, to create the next set of bits to write to the IIO.

When determining how to write the information, the stage system 102, 108, or 110 will also select a manner in which the state change results in a predictable change in the IIO. In one embodiment, this may be accomplished when a binary string representation of the current state of the IIO is transformed with a security string, such as by using a private key to encrypt a binary string. When determining how to write the information, the stage system 102, 108, or 110 will also identify a writing scheme, for example, as described above with respect to FIG. 8, which may be suitable for the then-current stage of the workflow. Further, the rules for increasing the complexity of the IIO to increase the information density may be determined before the start of the workflow, so that the IIO encoding remains predictable after the complexity is increased.

The stage system 102, 108, or 110 performing the incremental writing at workflow stage I then writes the information to form a new IIO. When writing, the stage system 102, 108, or 110 may use the incremental intensity or color process, the selected scrambling technique, the selected manner for achieving a predictable state change, any rules for increasing complexity in the IIO, and the selected writing scheme to write the information to the IIO. During each writing stage in the workflow, previously written information is not generally removed or changed, but rather the additional information is added, changing the state of the IIO.

While the number of bits to be written is preset in one embodiment, the actually writing of the information may take place dynamically as the workflow progresses. As such, the candidate areas that are actually written to are determined in real time according to, in part, the areas available for writing, the number of bits to be written and the algorithms to be used.

The product and the IIO, such as a document, can be printed and stored. When the IIO is completely physical, the document with the IIO printed thereon as it was received can be overprinted so that the newly written to areas will be filled in the printed version. When the IIO is physical and electronic, the electronic version of the document and the incrementally written to IIO can be reprinted or overprinted, if desired. When the incrementally written to IIO is saved, it is to be understood that it will replace any prior versions of the IIO.

The product and incrementally written to IIO are then shipped, electronically or physically, to the next entity in the workflow, such as workflow stage II system 108, as described with respect to FIG. 1. Similarly, when the action, task, etc. set forth in the workflow stage II instructions have been performed, the IIO is incrementally written to according to the workflow stage II instructions, for example, following the same method 1100. The document and its incrementally-overwritten IIO can then be printed and stored by the stage three system 110, which adds its increment to the IIO.

At each stage, the previous states of the IIO are still provable, either because there are no new available candidate areas in the later stages of the IIO or because the rules used to increase the IIO are predetermined and, thus, predictable. In embodiments where the stage system 102, 108, or 110 at a stage in the workflow has access to all the rules governing writing at the previous stages, the stage system 102, 108, or 110 can automatically check all previous states of the IIO for validity when checking the then-current state.

In any of the embodiments disclosed herein, if multiple identifying objects are part of the same shipment, it may be desirable to have the same pre-filled set of data bits. In some embodiments, disclosed herein the IIOs retain a set amount of real estate on a document even though information is incrementally written thereto throughout a workflow. The state of the IIO and the then-current stage of the workflow may be determined directly from the intensity or color of the tiles and the percentage of the tiles that are filled in or saturated, even without knowing how to interpret the data embedded therein.

Figure 12:
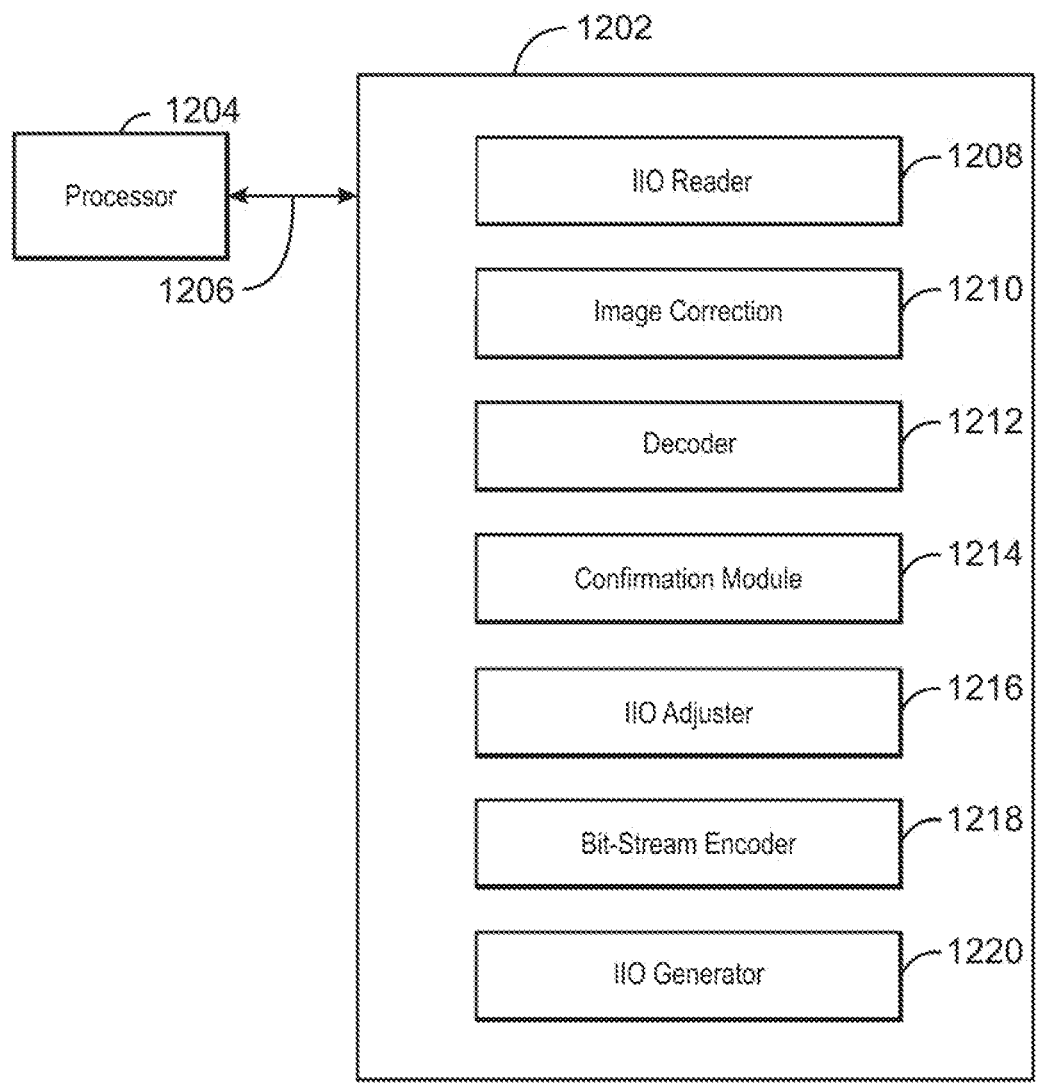
FIG. 12 is a block diagram of a non-transitory, computer readable medium containing code for generating an IIO in accordance with an embodiment.

FIG. 12 is a block diagram 1200 of a non-transitory, computer readable medium 1202 containing code for generating an IIO in accordance with an embodiment. A processor 1204 may access the non-transitory, computer readable medium 1200 over a bus 1206, or other communication system, to obtain code configured to direct the processor 1204 to confirm a product based on an IIO associated with the product. The non-transitory, computer readable medium 1202 may include any combination of read only memory (ROM), random access memory (RAM), hard drives, optical drives, RAM drives, or flash drives.

The non-transitory, computer readable medium 1202 may include a module 1208 to read an IIO and a second module 1210 to correct the image and calibrate the reader. Another module 1212 may decode the IIO to generate a first bit stream. A module 1214 may confirm the code, for example, by following the instructions that should have resulted in the current IIO, or by accessing an identifying object registry. Another module 1216 may be used to adjust the IIO, either by increasing or decreasing the complexity of the IIO to change the information density of the IIO. A bit-stream encoder module 1218 may generate the codes needed to create the IIO. Another module 1220 may then identify open tiles in the code regions of the IIO and overwrite the additional information onto the IIO.

What is claimed is:

1. A method comprising:
    analyzing an incremental information object (IIO) printed on a medium, wherein the IIO comprises a plurality of tiles, and wherein the plurality of tiles comprise a code that is an original code for validating an identity of a product;
    successfully confirming the code to validate a previous stage of a workflow performed on the product;
    determining that the workflow has changed;
    responsive to determining that the workflow has changed, modifying the IIO to change the information density of the IIO;
 generating a new code comprising a bitstream, the new code being the original code with additional code parts, the bitstream including information relating to a current stage of the workflow; and
    overwriting the bitstream on the plurality of tiles printed on the medium by printing the additional code parts of the new code on the original code on the medium, the IIO comprising information relating to the previous stage of the workflow and the current stage of the workflow.
2. The method of claim 1, comprising dividing each of the plurality of tiles into smaller regions.
3. The method of claim 1, comprising writing the bitstream using a grayscale to overwrite a two-dimensional IIO and create a three-dimensional ITO.
4. The method of claim 1, comprising writing the bitstream using a color scale to overwrite a two-dimensional IIO and create a three-dimensional ITO.
5. The method of claim 1, comprising dividing tiles in a payload area of the plurality of tiles into smaller tiles.
6. The system of claim 1, comprising overwriting areas outside of and proximate to tiles representing non-payload indicia (NPI).
7. The system of claim 1, comprising converting tiles representing non-payload indicia to tile representing payload indicia.
8. A system comprising:
    a processor; and
    a memory, wherein the memory comprises computer readable code configured to direct the processor to:
        analyze an incremental information object (IIO) printed on a medium, wherein the IIO comprises a plurality of tiles, and the plurality of tiles comprise a code that is an original code for validating an identity of a product;
        successfully confirm the code to validate a previous stage of a workflow performed on the product;
        determine that the workflow has changed;
        responsive to determining that the workflow has changed, modify the IIO to change the information storage density of the IIO;
    generate a new code comprising a bitstream, the new code being the original code with additional code parts, the bitstream including information relating to a current stage of the workflow; and
    overwriting the bitstream onto the plurality of tiles printed on the medium by printing the additional code parts of the new code on the original code on the medium, the IIO comprising information relating to the previous stage of the workflow and the current stage of the workflow.
9. The system of claim 8, wherein a tile within the IIO represents encoded data by differing levels of intensity, differing colors, or both.
10. The system of claim 8, wherein the processor is to determine that the workflow has changed by determining that a number of stages in the workflow have increased.
11. The system of claim 8, wherein the IIO printed on the medium is a two-dimensional IIO, and the processor is to modify the IIO so that the IIO is a three-dimensional ITO.
12. The system of claim 8, wherein the memory comprises computer readable code to modify the IIO by adding changes in grayscale intensity, color intensity, or both.
13. The system of claim 8, wherein the memory comprises computer readable code to modify the IIO by dividing the plurality of tiles into smaller tiles.
14. The system of claim 8, comprising a device configured to overprint the bitstream onto an IIO physically located on the product.
15. The system of claim 8, comprising a handheld device, a mobile device, or a bar code reader configured to read the ITO.
16. The system of claim 8, wherein the memory comprises computer readable code for setting non-payload indicia (NPI) in the ITO.
17. A non-transitory, computer readable medium comprising code configured to direct a processor to:
    image a document to obtain an incremental information object (IIO) printed on a medium, wherein the IIO comprises a plurality of tiles configured to store a code for validating an identity of a product;
    analyze the IIO to identify the code;
    successfully confirm the code to validate a previous stage of a workflow performed on the product;
    determine that the workflow has changed;
    responsive to determining that the workflow has changed, modify the IIO to change the information density of the IIO;
    generate a new code comprising a bitstream, the new code being the original code with additional code parts, the bitstream including information relating to a current stage of the workflow; and
    overwrite the bitstream onto the plurality of tiles printed on the medium by printing the additional code parts of the new code on the original code on the medium, the IIO comprising information relating to the previous stage of the workflow and the current stage of the workflow.
18. The non-transitory, computer readable medium of claim 17, comprising code configured to direct a processor to increase the information density of the ITO.

19. The non-transitory, computer readable medium of claim 18, wherein the code is configured to direct the processor to modify the IIO by adding colors, grayscale levels, or both to the tiles of the ITO.

20. The non-transitory, computer readable medium of claim 17, comprising code configured to divide at least a portion of the plurality of tiles into smaller areas.

\* \* \* \* \*

UNITED STATES PATENT AND TRADEMARK OFFICE
CERTIFICATE OF CORRECTION

PATENT NO. : 9,613,327 B2
APPLICATION NO. : 14/747435
DATED : April 4, 2017
INVENTOR(S) : Steven J. Simske et al.

It is certified that error appears in the above-identified patent and that said Letters Patent is hereby corrected as shown below:

In the Claims

In Column 19, Line 47, in Claim 3, delete "ITO." and insert -- IIO. --, therefor.

In Column 19, Line 50, in Claim 4, delete "ITO." and insert -- IIO. --, therefor.

In Column 20, Line 26, in Claim 11, delete "ITO." and insert -- IIO. --, therefor.

In Column 20, Line 38, in Claim 15, delete "ITO." and insert -- IIO. --, therefor.

In Column 20, Line 41, in Claim 16, delete "ITO." and insert -- IIO. --, therefor.

In Column 20, Line 67, in Claim 18, delete "ITO." and insert -- IIO. --, therefor.

In Column 21, Line 4, in Claim 19, delete "ITO." and insert -- IIO. --, therefor.

Signed and Sealed this
Twelfth Day of September, 2017

Joseph Matal
*Performing the Functions and Duties of the*
*Under Secretary of Commerce for Intellectual Property and*
*Director of the United States Patent and Trademark Office*